US012190661B2

(12) United States Patent
Tsushima

(10) Patent No.: US 12,190,661 B2
(45) Date of Patent: Jan. 7, 2025

(54) ROTATION DETECTION DEVICES, METHOD, AND PROGRAM

(71) Applicant: Bitkey Inc., Tokyo (JP)

(72) Inventor: Masatoshi Tsushima, Chuo-ku (JP)

(73) Assignee: Bitkey Inc. (JP)

( * ) Notice: Subject to any disclaimer, the term of this patent is extended or adjusted under 35 U.S.C. 154(b) by 6 days.

(21) Appl. No.: 17/973,587

(22) Filed: Oct. 26, 2022

(65) Prior Publication Data

US 2023/0136010 A1    May 4, 2023

(51) Int. Cl.
 G01B 21/22    (2006.01)
 G01D 5/12    (2006.01)
 G07C 9/00    (2020.01)

(52) U.S. Cl.
 CPC ......... G07C 9/00182 (2013.01); G01B 21/22 (2013.01); G01D 5/12 (2013.01); *G07C 9/00174* (2013.01)

(58) Field of Classification Search
 CPC .............................. G07C 9/00182; G01B 21/22
 See application file for complete search history.

(56) References Cited

U.S. PATENT DOCUMENTS

2020/0219347 A1* 7/2020 Lv ................. E05B 47/0002
2023/0280367 A1* 9/2023 Li ........................ G01P 13/00
                                                          73/514.02

FOREIGN PATENT DOCUMENTS

| JP | H10-266649 A | 10/1998 |
| JP | 2007-198053 A | 8/2007 |
| JP | 2016-102353 A | 6/2016 |
| JP | 2016-534331 A | 11/2016 |
| JP | 2018-115447 A | 7/2018 |
| JP | 2020-059996 A | 4/2020 |

* cited by examiner

*Primary Examiner* — Daniell L Negron
(74) *Attorney, Agent, or Firm* — Harness, Dickey & Pierce, P.L.C.

(57) ABSTRACT

A rotation detection device according to one embodiment includes an angular velocity sensor attached to a rotating body that rotates and configured to detect an angular velocity of the rotating body, and at least one processor configured to perform a control based on the angular velocity detected by the angular velocity sensor, in which the at least one processor is configured to perform processing for calculating a first angle of the rotating body before a rotation operation is performed on the rotating body and a second angle of the rotating body after the rotation operation is performed on the rotating body based on the angular velocity sensor.

10 Claims, 12 Drawing Sheets

ROTATION DETECTION DEVICES, METHOD, AND PROGRAM

BACKGROUND

1. Technical Field

The present invention relates to a rotation detection device, a method, and a program for detecting a rotation angle of a rotating body that rotates.

2. Related Field

There is a known device that is attached to a rotating body that rotates around an axis, such as a hinged door, and detects the rotation angle of the rotating body based on an acceleration detected by an acceleration sensor and a distance from the acceleration sensor to a hinge that gives a rotation axis of the rotating body. For example, JP 2016-534331 A1 discloses a device that detects the rotation angle of the rotating body using the acceleration sensor as described above. However, such device may not be able to detect the rotation angle of the rotating body accurately by using the acceleration sensor.

The present embodiment has been made in view of the background described above, and an object thereof is to provide a rotation detection device and the like capable of detecting the rotation angle of the rotating body more accurately.

SUMMARY

In order to solve the problem described above, a rotation detection device according to one embodiment includes: an angular velocity sensor configured to be attached to a rotating body that rotates to detect an angular velocity of the rotating body; and at least one processor configured to perform a control based on the angular velocity detected by the angular velocity sensor, in which the at least one processor is configured to perform processing for calculating a first angle of the rotating body before a rotation operation is performed on the rotating body and a second angle of the rotating body after the rotation operation is performed on the rotating body based on the angular velocity sensor.

Further, a method according to one embodiment is performed by executing a predetermined instruction command by at least one processor in a computer including an angular velocity sensor attached to a rotating body that rotates and configured to detect an angular velocity of the rotating body and the at least one processor configured to perform a control based on the angular velocity detected by the angular velocity sensor, and includes a step of calculating a first angle of the rotating body before the rotation operation is performed on the rotating body based on the angular velocity sensor and a second angle of the rotating body after the rotation operation is performed.

In addition, a program according to one embodiment causes a computer including the angular velocity sensor attached to a rotating body that rotates and configured to detect an angular velocity of the rotating body, and at least one processor configured to perform a control based on the angular velocity detected by the angular velocity sensor, to function as a processor configured to perform processing of calculating a first angle of the rotating body before a rotation operation is performed on the rotating body and a second angle of the rotating body after the rotation operation is performed based on the angular velocity sensor.

According to the present embodiment, it is possible to provide a rotation detection device and the like capable of detecting the rotation angle of the rotating body more accurately.

BRIEF DESCRIPTION OF THE DRAWINGS

FIG. 10A is a first view illustrating an automatic locking unit 4 attached to a key of a door 3 at an entrance of a house or the like;

FIG. 10B is a second view illustrating the automatic locking unit 4 attached to the key of the door 3 at the entrance of the house or the like;

DETAILED DESCRIPTION

First Embodiment

Figure 1:
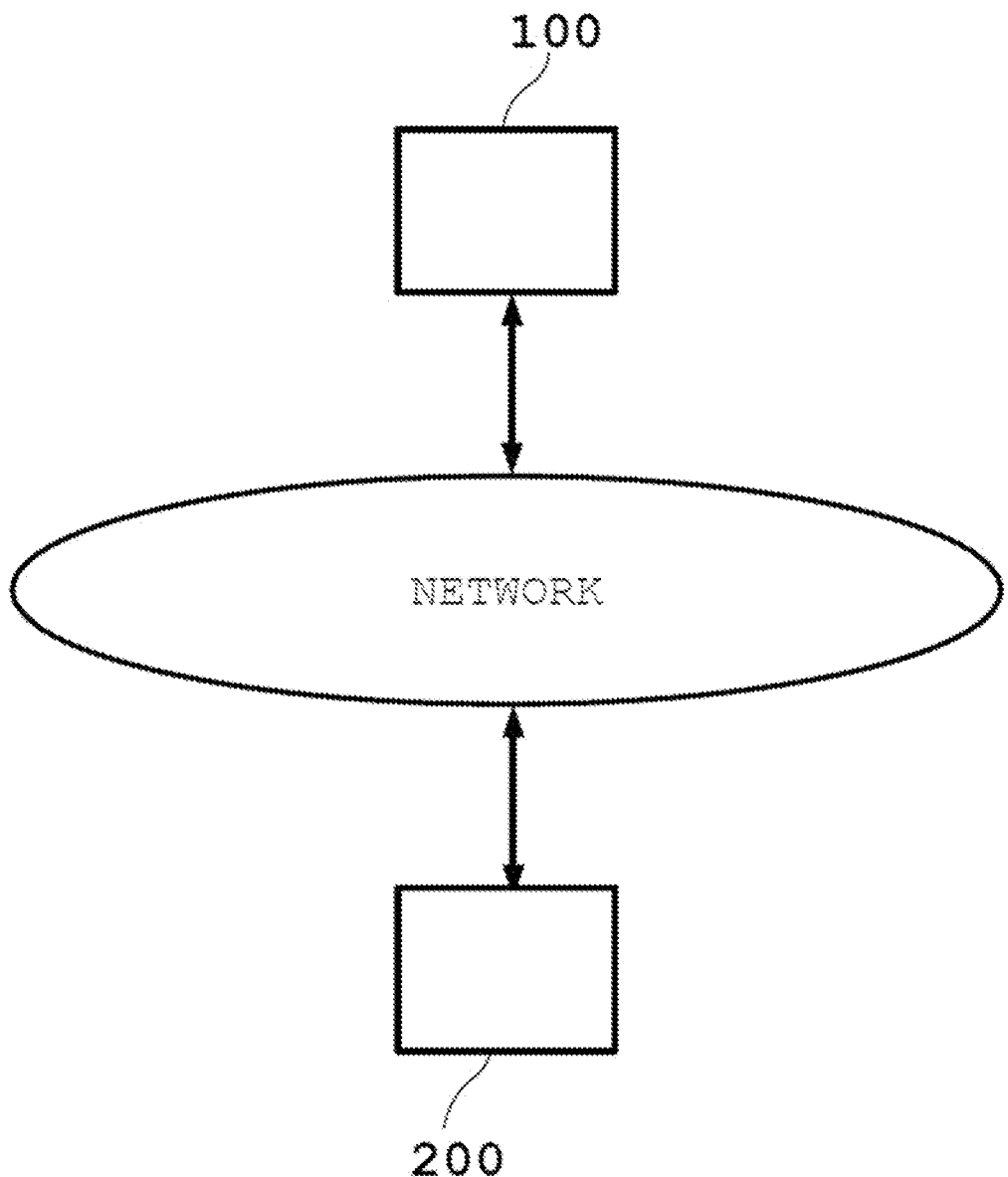
FIG. 1 is a diagram illustrating a configuration of a system 1 including a rotation detection device 100 according to one embodiment.

A first embodiment of the present disclosure will be described with reference to the accompanying drawings. Further common components and processing in the drawings are denoted by the same reference numerals. Moreover, hereinafter, an opening portion provided as the entrance on a wall surface of the house, an opening portion of a household refrigerator, a portion of a keyboard of a notebook PC, and the like, which are opened and closed by the door, or covered or exposed by a lid, may be collectively referred to as the opening portions. In addition, hereinafter, objects that rotate around the rotation axis, such as the door and the lid, are collectively referred to as the rotating body. Note that the number of rotation axes of the rotating body is not necessarily one, and the objects that rotate around a plurality of axes is also included in the rotating body. Also, an angular velocity of rotation is described as a rotation angular velocity, and an angle of rotation is described as a rotation angle.

Further, n is a positive integer, and i is an integer of 1 to n. Moreover, both a state in which the opening portions are opened and a state in which the rotating body does not close the opening portions are collectively referred to as the opened state. In addition, both the state in which the opening portions are closed and the state in which the rotating body closes the opening portions are collectively referred to as the closed state. Also, in the following description, there is no substantial difference between "equal to or less than" and "less than", and between "equal to or more than" and "more than".

1. Outline of System According to Present Disclosure

For example, the opening portion through which a person enters and exits, such as an entrance of a house, an automobile, and a keeping room for an animal, is generally opened and closed by a hinged door that rotates around an axis perpendicular to floor. In addition, for example, the opening portion of the household electric appliance such as a horizontal opening type refrigerator and a horizontal opening type microwave oven for household use is also opened and closed by an open door type door that rotates around the axis perpendicular to floor.

On the other hand, for example, a portion such as a document glass (a platen glass) disposed on an upper surface of a copier is covered or exposed by a lid or an automatic document feeder (ADF) that rotates on an axis horizontal to floor. In addition, for example, a keyboard portion of the notebook PC is also opened and closed by disposing a display on a surface facing the keyboard portion when closed with a lid rotating around the axis horizontal to floor. As described above, the opening portions and the like of various objects are opened and closed by the rotating body such as the door and the lid that rotate around the axis. In addition, here, it is described that the rotation is performed around the axis horizontal to floor, but it is natural that the rotation is not limited to only this. For example, the axis may be in a twisted position other than horizontal with respect to a floor surface.

When the door that opens and closes the entrance of the house, the door that opens and closes the entrance of the keeping room for an animal, the door that opens and closes the opening portion of a refrigerator, and the like remain open against a user's will, various problems such as theft, escape of the animal, and decay of a refrigerated item occur. Therefore, it is very important to detect whether such opening portion is closed by the rotating body such as a door and is in the opened state, or is not closed and is in the opened state. The rotation detection device 100 according to the embodiment described below is configured to accurately detect whether the opening portion is closed by the rotating body, or is not closed and is in the opened state based on the angle of the rotating body.

2. Configuration of System 1

FIG. 1 is a diagram illustrating a configuration of a system 1 including the rotation detection device 100 according to one embodiment. As illustrated in FIG. 1, the system 1 includes the rotation detection device 100 and the external unit 200. For example, the external unit 200 includes the household electric appliance, a monitoring camera (a security camera), an administrator terminal unit of an administrator who manages a facility where the rotating body 20 is disposed, a user terminal unit of a user who uses the rotating body 20, a vehicle including a door as the rotating body 20, a housing container including a lid as the rotating body 20, and a lock/unlock control unit that controls locking and unlocking (locking/unlocking) of the key attached to the rotating body 20 using the rotation detection device 100 or a combination thereof.

The rotation detection device 100, the household electric appliance, the administrator terminal unit, the user terminal unit, the lock/unlock control unit, and the like may be connected to be able to transmit and receive information to and from each other via a network including a wired communication line such as Internet and a wireless communication line. Further, hereinafter, the household electric appliance, the administrator terminal unit, the user terminal unit, and the lock/unlock control unit may be collectively referred to as the external unit 200. Note that the rotation detection device 100 and the external unit 200 may be configured integrally or may be configured separately.

3. Configuration of Rotation Detection Device 100

Figure 2A:
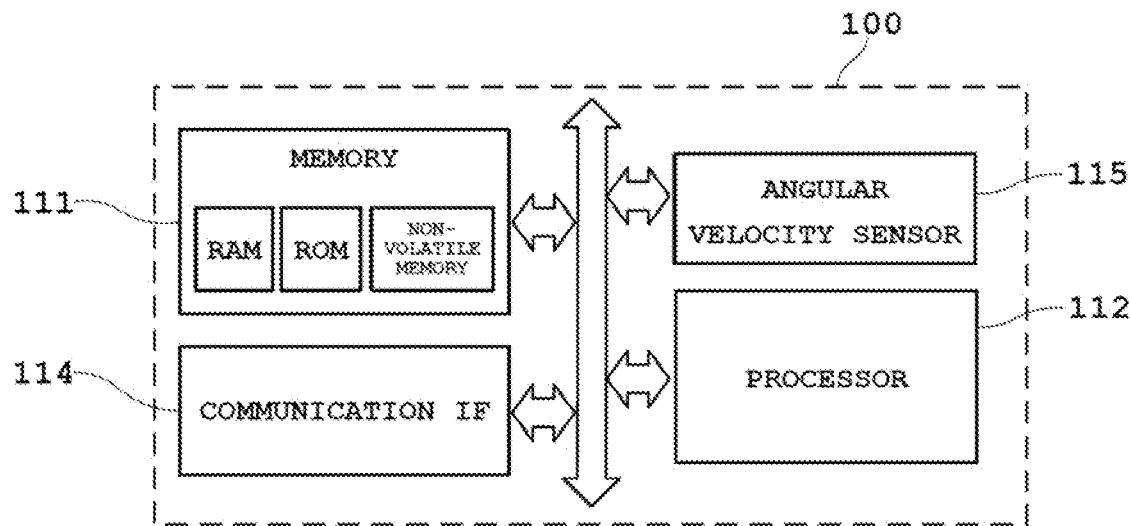
FIG. 2A is a block diagram illustrating an example of a configuration of the rotation detection device 100 illustrated in FIG. 1.

FIG. 2A is a block diagram illustrating an example of a configuration of the rotation detection device 100 according to the embodiment illustrated in FIG. 1. Note that the rotation detection device 100 does not need to include all of the components illustrated in FIG. 2A, and can have a configuration in which a part is omitted, or another component can be added.

As illustrated in FIG. 2A, the rotation detection device 100 includes a memory 111 including a RAM, a ROM, a non-volatile memory, an HDD, and the like, a processor 112 including a CPU and the like, a communication interface (a communication IF) 114, and an angular velocity sensor 115. Moreover, these components are electrically connected to each other via a control line and a data line. Note that the memory 111 may also include a database, an external storage device, and the like connected via the communication interface 114 and the like. In other words, the rotation detection device 100 is a computer including the angular velocity sensor 115 in addition to the memory 111, the processor 112, and the communication interface 114.

The memory 111 includes the RAM, the ROM, the nonvolatile memory, and the HDD, and functions as a storage unit. The memory 111 stores the instruction command for executing an application or an OS according to the present disclosure as a program. Such a program is loaded into the memory 111 from a recording medium or a network via the communication interface 114 and executed by the processor 112.

Further, in the present disclosure, the memory 111 (in particular, the RAM) is temporarily used to execute writing and reading of data while the program is executed by the processor 112.

Moreover, in the present disclosure, the memory 111 stores a program for causing the processor to function as a processor configured to perform the processing of calculating, the first angle of the rotating body 20 before the rotation operation is performed on the rotating body 20 based on the angular velocity sensor 115 and the second angle of the rotating body 20 after the rotation operation is performed, and detecting that the rotating body 20 is in the opened state based on the first angle, the second angle, and a predetermined threshold.

The processor 112 includes a CPU (a microcomputer), and functions as a control unit for controlling other connected components based on various programs stored in the memory 111. Note that the processor 112 may include a single CPU or a plurality of CPUs.

Further, in the present disclosure, the processor 112 executes a program for performing the processing of calculating, the first angle of the rotating body 20 before the rotation operation is performed on the rotating body 20 based on the angular velocity sensor 115 and a second angle of the rotating body 20 after the rotation operation is performed, and detecting that the rotating body 20 is in the opened state based on the first angle, the second angle, and the predetermined threshold.

The communication interface 114 functions as, for example, a communication unit that performs the processing such as modulation and demodulation in order to transmit and receive programs, various types of information, and the like used in the rotation detection device 100 to and from the PC, a server device (not illustrated), and the like. The communication interface 114 communicates with the PC, the server device, and the like according to the wireless communication method or a known wired communication method described above. In the present disclosure, the rotation detection device 100 transmits information such as whether the opening portion is in the closed state or the opened state to the PC, the server device, or the like via the communication interface 114.

Further, the communication interface 114 communicates with the external unit 200 connected via a network. Moreover, communication with the external unit via the communication interface 114 includes transmission of a control signal to the household electric appliance and reception of a signal from the household electric appliance, which are disposed in the facility such as a house to which the rotation detection device 100 is attached and are controlled in response to detection of the closed state or the opened state of the rotating body 20 such as a door by the rotation detection device 100. In addition, the communication with the external unit includes transmission and reception of information with a manager terminal unit of a manager who manages a facility such as a house in which the rotating body such as a door is installed. Also, the communication with the external unit includes transmission and reception of information to and from the user terminal unit of the user who manually operates and rotates the rotating body 20 such as a door. Besides, the communication with the external unit includes transmission and reception of information to and from the lock/unlock control unit that controls the lock/unlock of the key of the rotating body 20 using the rotation detection device 100.

The angular velocity sensor 115 is attached to the rotating body 20 that rotates and functions as a detection unit for detecting the angular velocity of the rotating body 20. Such angular velocity sensor 115 is, for example, a gyro sensor. Three axes $X_{as}$, $Y_{as}$, and $Z_{as}$ orthogonal to each other are set in advance in the angular velocity sensor 115. The angular velocity sensor 115 is activated from a stop state under the control of the processor 112 to be in an operating state, consumes power, detects a rotation angular velocity $\theta$ of the rotation detection device 100, and outputs a rotation angular velocity $\theta$ to the processor 112. Further, the angular velocity sensor 115 stops the detection of the rotation angular velocity $\theta$ of the rotation detection device 100 under the control of the processor 112, and enters the stop state in which power is not consumed.

4. Configuration of External Unit 200

Figure 2B:
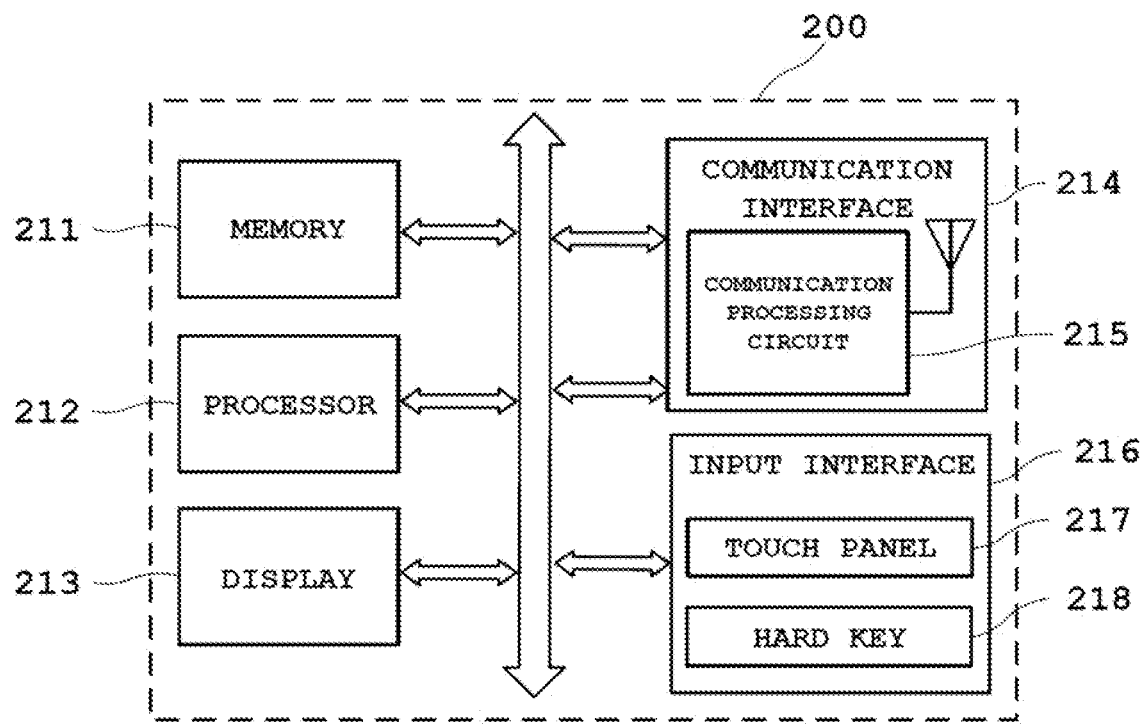
FIG. 2B is a block diagram illustrating an example of a configuration of a portion related to information processing in an external unit 200 illustrated in FIG. 1.

FIG. 2B is a block diagram illustrating an example of a configuration of a portion related to information processing in the external unit 200 illustrated in FIG. 1. Further, the external unit 200 does not need to include all the components illustrated in FIG. 2A, and may have a configuration in which a part is omitted, or may include other components. Moreover, hereinafter, the "portion related to information processing in the external unit 200" is abbreviated as the "external unit 200".

According to FIG. 2B, the external unit 200 includes a memory 211, a processor 212, a display 213, a communication processing circuit 215, a communication interface 214 including an antenna, and an input interface 216 including a touch panel 217, a hard key 218, and the like. Then, these components are electrically connected to each other via the control line and the data line. Note that the touch panel 217 and the hard key 218 may be installed outside the external unit 200 and connected via the input interface 216, or may be included in the external unit 200 and connected via the input interface 216.

The processor 212 includes a CPU and peripheral circuits thereof, and performs the processing for functioning as a control unit that controls other connected components based on various programs stored in the memory 211. Specifically, the processor 212 reads a program for processing a signal received from the rotation detection device 100 and a program for executing the OS from the memory 211 and executes the program. In the present embodiment, the processor 212 performs the processing for receiving the signal indicating whether the rotating body 20 is in the opened state or the closed state from the rotation detection device 100 via the communication interface 214. In addition, the processor 212 notifies the user of the external unit 200 of whether the rotating body 20 is in the opened state or the closed state by displaying an image on the display 213 and outputting sound from a speaker built in the display 213.

Further, the processor 212 further performs the processing of receiving an operation performed on the touch panel 217 and the hard key 218 by the user via the input interface 216 and transmitting information indicating the received operation to the rotation detection device 100 via the communication interface 214. Note that the processor 212 may include a single CPU, or may include a plurality of CPUs.

Further, the processor 212 may be configured by appropriately combining other types of processors such as a GPU specialized for image processing.

The memory 211 includes the ROM, the RAM, the nonvolatile memory, the HDD, and the like, and functions as the storage unit. The ROM stores the instruction command for executing the application or the OS according to the present embodiment as a program. The RAM is a memory used for the writing and reading data while a program stored in the ROM is processed by the processor 212. The nonvolatile memory is a memory in which the writing and reading of data are executed by execution of the program, and the data written here is stored even after the execution of the program is completed.

In the present embodiment, the memory 211 stores a program for processing for receiving the signal indicating whether the rotating body 20 is in the opened state or the closed state from the rotation detection device 100 via the communication interface 214, a program for performing processing of notifying the user of the external unit 200 of whether the rotating body 20 is in the opened state or the closed state by an image display on the display 213 and sound output from the speaker built in the display 213, and the like. In addition, although not particularly illustrated as the memory 211, it may be connected to a removable storage medium, a database, or the like via the input interface 216.

The communication interface 214 functions as the communication unit that transmits and receives information to and from another external unit other than the remotely installed rotation detection device 100 and the external unit 200 via the communication processing circuit 215 and the antenna. The communication processing circuit 215 performs a program for executing processing of information according to the present embodiment, and processing for transmitting and receiving information indicating the opened state or the closed state of the rotating body 20 to and from the external unit 200.

The communication processing circuit 215 is processed based on a broadband wireless communication method represented by an LTE system, but can also be processed based on a method related to a narrowband wireless communication such as a wireless LAN represented by IEEE802.11 or Bluetooth (registered trademark). Further, the wired communication can be used instead of or in addition to the wireless communication.

The input interface 216 is connected to the touch panel 217 and the hard key 218 in the wired or wireless manner, and various methods such as a serial port, a parallel port, and a USB can be cited as an example of the input interface 216 functioning as an input/output unit that inputs/outputs various types of information. Further, in a case where connection is performed in the wireless manner (for example, Bluetooth (registered trademark)), the communication interface 214 and the functions thereof can be shared.

All the components such as the touch panel 117 and the hard key 218 are connected to the external unit 200 via the input interface 216. Note that the external unit 200 may or may not include these components.

The touch panel 217 is disposed so as to cover the display 213, for example, and outputs information of position coordinates corresponding to image data displayed by the display 213 to the processor 212. As the touch panel method, a known method such as a resistive film method, a capacitive coupling method, or an ultrasonic surface acoustic wave method can be used. In the present embodiment, the touch panel 217 detects a swipe operation or a tap operation on each icon or the like displayed on the display 213 by an indicator. Further, it is detected that an input related to the speed of movement is made according to the detected tap operation. Note that, although the input interface 216 included in the external unit 200 is used in the present embodiment, the input interface 216 connected to a main body including the processor 212 or the like in a wireless or wired manner can also be used.

The hard key 218 includes a mechanical switch, a button, and the like, receives an operation of the user of the external unit 200, and outputs the operation to the processor 212.

The display 213 has a built-in speaker, and functions as a display unit that displays the image information stored in the memory 211 and the opened state or the closed state of the rotating body 20 received from the rotation detection device 100 in response to the instruction from the processor 212. The display 213 includes, for example, a liquid crystal display or an organic EL display.

5. Method for Detecting Opened State and Closed State of Rotating Body 20

Figure 3A:
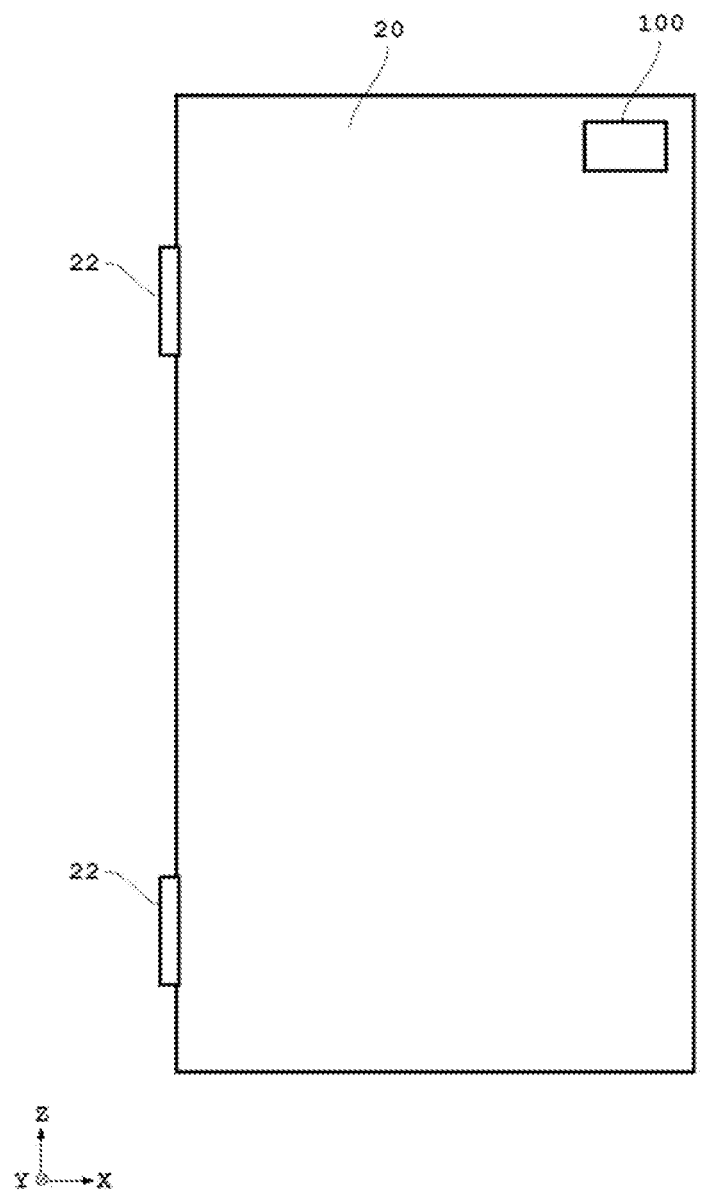
FIG. 3A is a first view illustrating the rotation detection device 100 attached to a rotating body 20.
Figure 3B:
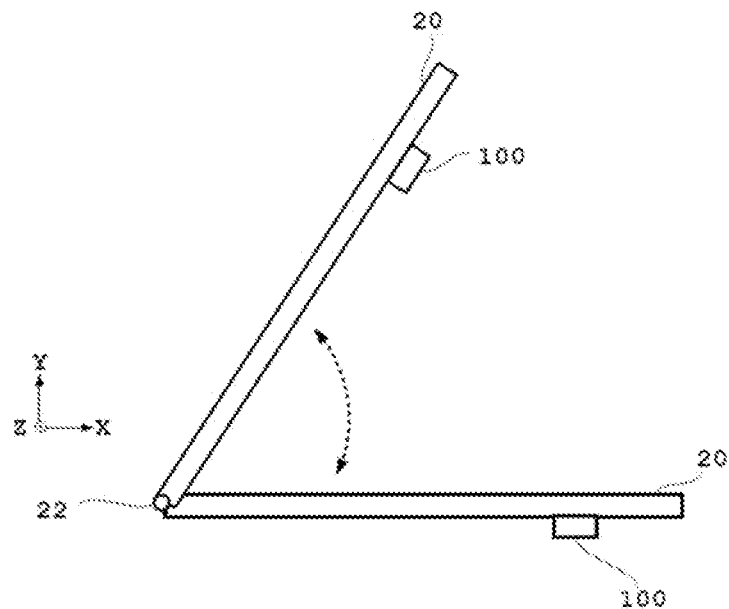
FIG. 3B is a second view illustrating the rotation detection device 100 attached to the rotating body 20.

FIGS. 3A and 3B are first and second views illustrating the rotation detection device 100 attached to the rotating body 20 such as a door of a house, a household electric appliance, or the like, or a lid of a notebook PC. Note that FIGS. 3A and 3B illustrate the rotating body 20 having a rectangular thin shape. A direction parallel to a short side of a rectangular surface of the rotating body 20 is an X direction, a direction parallel to a long side of the rectangular surface of the rotating body 20 is a Z direction, and a direction orthogonal to both the X direction and the Z direction is a Y direction.

In other words, an X, Y, and Z coordinate systems can be defined for the rotating body 20 as illustrated in FIGS. 3A and 3B. As shown in FIG. 3B, a hinge 22 having a rotation axis parallel to a Z-axis is attached to the rotating body 20, and the rotating body 20 can rotate around the axis of hinge 22. In addition, when the rotating body 20 is the door of the entrance of the house, the hinge 22 fixes the door to the entrance, and rotates the door around the axis when the user manually performs the rotation operation of pushing the door.

Next, a method of calculating the rotation angle ω and its magnitude |ω| from the rotation angular velocity θ detected by the angular velocity sensor 115 will be described. Hereinafter, a case where the processor 112 controls the angular velocity sensor 115 to detect the rotation angular velocity θ of the rotating body 20 between times $t_0$ to $t_{i-1}$ and $t_i$ to $t_n$ at time intervals of Δt will be described as a specific example. For example, Δt is 50 milliseconds, and time T between to and $t_0$ is 10 seconds.

An angular velocity $θ_i$ detected by the angular velocity sensor 115 at the time $t_i$ when the time Δt×i has elapsed from the time $t_0$ includes components $θ_{iX}$, $θ_{iY}$, and $θ_{iZ}$ around the axes $X_{as}$, $Y_{as}$ and $Z_{as}$, respectively. Accordingly, the angular velocity θi detected at the time $t_i$ by the angular velocity sensor 115 can be expressed as $θ_i=(θ_{iX}, θ_{iY}, θ_{iZ})$ using a vector. Similarly, since a rotation angle $ω_i$ of the rotating body 20 at the time $t_i$ also includes components $ω_{iX}$, $ω_{iY}$, and $ω_{iZ}$ around the axes $X_{as}$, $Y_{as}$, and $Z_{as}$, respectively, $ω_i=(ω_{iX}, ω_{iY}, ω_{iZ})$ can be expressed by using a vector.

As described above, X, Y, and Z coordinate axes orthogonal to each other are illustrated in FIGS. 3A and 3B. However, the directions of the X, Y, and Z coordinate axes are irrelevant to the directions of the $X_{as}$, $Y_{as}$, and $Z_{as}$ axes set in the angular velocity sensor 115 of the rotation detection device 100 described above, and do not usually coincide with each other. Accordingly, even when the rotating body 20 rotates around the Z axis, the angular velocity $θ_i$ detected by the angular velocity sensor 115 at the time $t_i$ can include not only the component $\theta_{iZ}$ of the angular velocity around the $Z_{as}$ axis but also all of the components $\theta_{iX}$, $\theta_{iY}$, and $\theta_{iZ}$.

In this case, after the start of the detection of the angular velocity of the rotating body 20, the value of the rotation angle $\omega_i$ of the rotating body 20 at the time $t_i$ can be represented by a value $\omega_i-1+\Delta t \times \theta_i$ obtained by adding a value obtained by multiplying the angular velocity $\theta_i$ detected at the time $t_i$ by the time interval $\Delta t$ to the rotation angle $\omega_{i-1}$ of the rotating body 20 at the time $t_{i-1}$. In other words, $\omega_i = \omega_{i-1} + \Delta t \times \theta_i$, and thus, this value $\omega_i$ is approximately equal to a time integrated value of the rotation angular velocity $\theta$ of the rotating body 20 at the time $t_0$ to $t_i$.

The component $\omega_{iX}$ around the $X_{as}$ axis of the rotation angle $\omega_i$ of the rotating body 20 at the time $t_i$ is a value obtained by adding a multiplication value $\Delta t \times \theta_{iX}$ of the time interval $\Delta t$ and the component $\theta_{iX}$ of the angular velocity $\theta_i$ detected at the time$_i$ to a component $\omega_{i-1X}$ of the rotation angle $\omega_{i-1}$ of the rotating body 20 at the time $t_{i-1}$. In other words, $\omega_{iX} = \omega_{i-1X} + \Delta t \times \theta_{iX}$, and this value $\omega_{iX}$ is substantially equal to a time integrated value of the component $\theta_X$ around the $X_{as}$ axis of the rotation angular velocity $\theta$ of the rotating body 20 between the times $t_0$ and $t_i$.

Similarly, the component $\omega_{iY}$ around the $Y_{as}$ axis of the rotation angle $\omega_i$ of the rotating body 20 at the time $t_i$ is a value obtained by adding the multiplication value $\Delta t \times \theta_{iX}$ of the time interval $\Delta t$ and the component $\theta_{iY}$ of the angular velocity $\theta_i$ detected at the time$_i$ to a component $\theta_{i-1Y}$ of the rotation angle $\omega_{i-1}$ of the rotating body 20 at the time $t_{i-1}$. In other words, $\omega_{iY} = \Delta t \times \theta_{iY}$, and this value $\omega_{iY}$ is substantially equal to the time integrated value of the component $\theta_Y$ around the $Y_{as}$ axis of the rotation angular velocity $\theta$ of the rotating body 20 between the times $t_0$ and $t_1$.

Similarly, the component $\omega_{iZ}$ of the rotation angle $\omega_i$ around the $Z_{as}$ axis of the rotating body 20 at the time $t_i$ is a value obtained by adding the multiplication value $\Delta t \times \theta_{iX}$ of the time interval $\Delta t$ and the component $\theta_{iZ}$ of the angular velocity $\theta_i$ detected at the time$_i$ to the component $\omega_{i-1Z}$ of the rotation angle $\omega_{i-1}$ of the rotating body 20 at the time $t_{i-1}$. In other words, $\omega_{iZ} = \omega_{i-1Z} + \Delta t \times \theta_{iZ}$, and this value $\omega_{iZ}$ is substantially equal to the time integrated value of the component $\theta_Z$ around the $Z_{as}$ axis of the rotation angular velocity $\theta$ of the rotating body 20 between the times $t_0$ and $t_i$.

In addition, the magnitude $|\omega_i\omega|$ of the rotation angle $\omega_i$ of the rotating body 20 at the time $t_i$ is a norm of the vector $(\omega_{iX}, \omega_{iY}, \omega_{iZ})$, that is, $|\omega_i| = (\omega_{iX}^2, \omega_{iY}^2, \omega_{iZ}^2)^{1/2}$. As described above, every time the angular velocity sensor 115 detects the rotation angular velocity $\theta_i$ of the rotating body 20 at the time $t_i$, the processor 112 can calculate the magnitude $|\omega_i|$ of the rotation angle $\omega_i$ of the rotating body 20 at the time $t_i$.

Figure 4A:
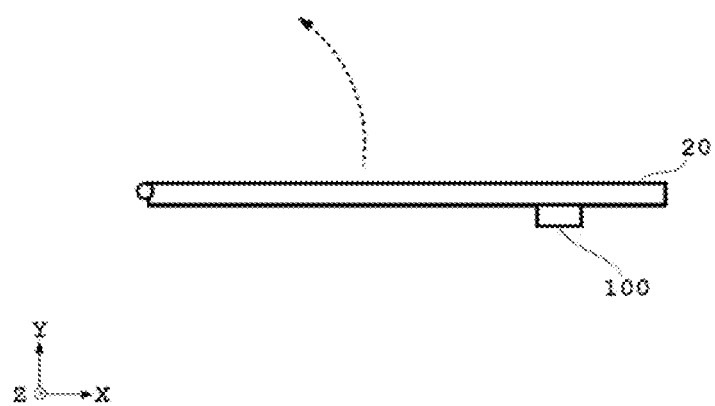
FIG. 4A is a first view exemplifying a movement of the rotating body 20 that was in a normal position and in a closed state, to be rotated in accordance with the rotation operation to be in an opened state and then returned to the normal position to be in the closed state.
Figure 4B:
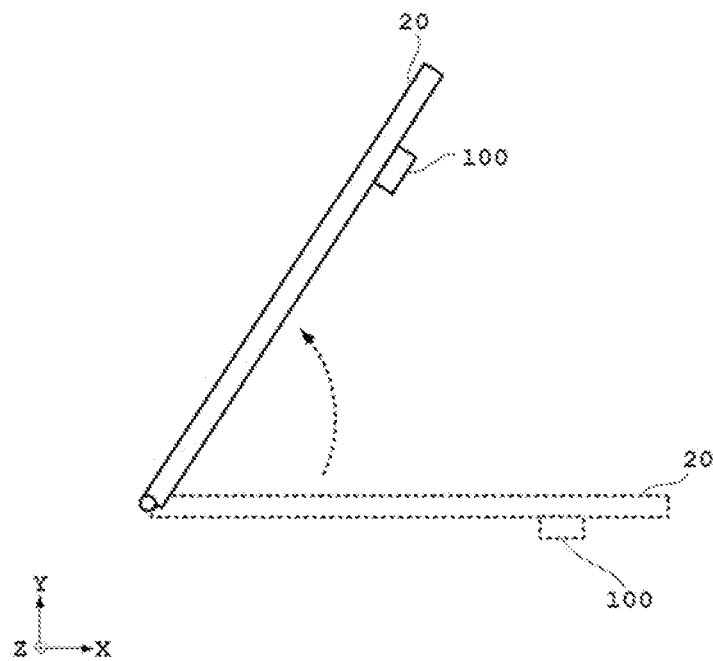
FIG. 4B is a second view exemplifying a movement of the rotating body 20 that was in the normal position and in the closed state, to be rotated in accordance with the rotation operation to be in the opened state and then returned to the normal position to be in the closed state.
Figure 4C:
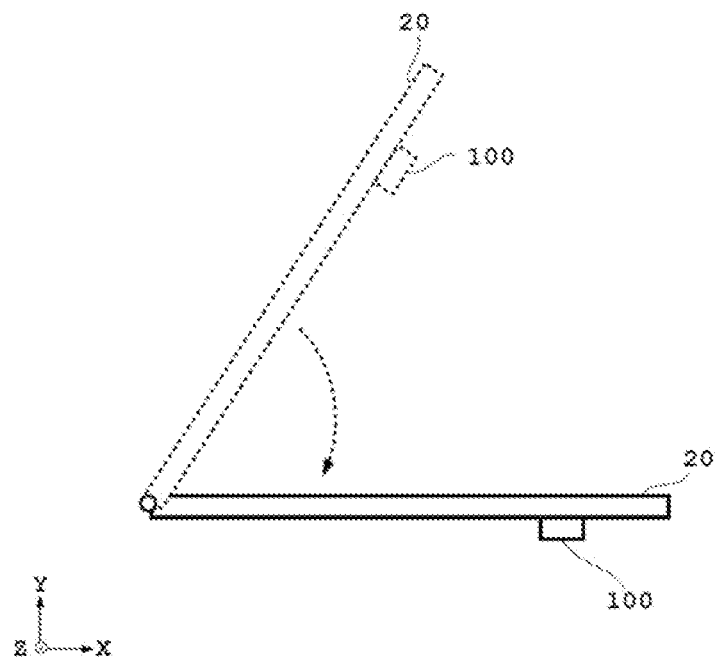
FIG. 4C is a third view exemplifying a movement of the rotating body 20 that was in the normal position and in the closed state, to be rotated in accordance with the rotation operation to be in the opened state and then returned to the normal position to be in the closed state.
Figure 5:
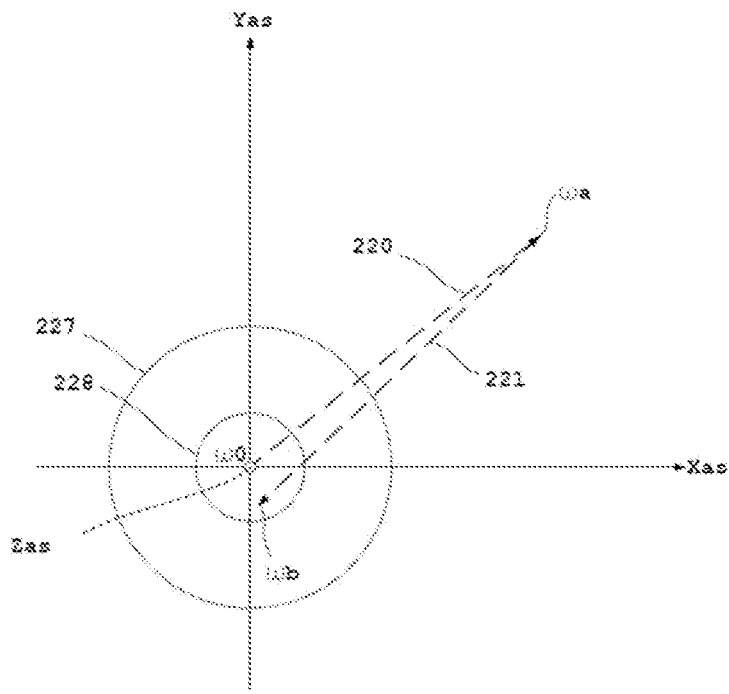
FIG. 5 is a first view illustrating a rotation angle ω of the rotating body 20 detected by the rotation detection device 100 when the rotating body 20 moves as illustrated in FIGS. 4A to 4C.
Figure 5:
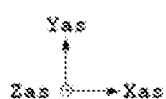

FIGS. 4A to 4C are first to third views illustrating motions until the rotating body 20 in the normal position in the closed state rotates in response to the rotation operation to be in the opened state, and then is returned to the normal position to be in the closed state. FIG. 5 is a diagram illustrating the rotation angle $\omega$ of the rotating body 20 detected by the rotation detection device 100 when the rotating body 20 moves as illustrated in FIGS. 4A to 4C. Further, for convenience of illustration, in FIG. 5 and the like, only the rotation angle around the $Z_{as}$ axis among the rotation angles $\omega$ of the rotating body 20 is illustrated, and the rotation angles around the $X_{as}$ axis and the $Y_{as}$ axis are omitted. A case will be described, where the rotating body 20 at the normal position as illustrated in FIG. 4A is rotated to the position illustrated in FIG. 4B by the rotation operation, and is returned to the normal position as illustrated in FIG. 4C by the rotation operation.

In this case, as shown in FIG. 5, the rotation angle $\omega$ of the rotating body 20 moves on a dotted line 220 from an origin $\omega_o$ of the rotation angle in the state at the time $t_0$ shown in FIG. 4A, and when the rotation angle $\omega$ exceeds a range of a preset threshold 227, it is determined that the rotating body 20 is in the opened state. Further, the rotating body 20 reaches a rotation angle $\omega_a$ in a state where the rotating body 20 illustrated in FIG. 4B is opened at the most. When the rotation operation is performed from the state illustrated in FIG. 4B to close the rotating body 20 and return to the normal position as illustrated in FIG. 4C, the rotation angle $\omega$ of the rotating body 20 moves on a dotted line 221 and reaches a rotation angle $\omega_b$ included in the range of a threshold 228 giving a normal range from the origin $\omega_o$.

Even in a case where the rotating body 20 is returned from the opened state to the normal position, the rotation angle $\omega_b$ does not necessarily overlap an origin coo, and the reason why an error occurs is that the angular velocity sensor 115 has an error, the angular velocity sensor 115 receives disturbance and noise when detecting the angular velocity $\theta$, or an error occurs in calculation of the magnitude $|\omega|$ of the rotation angle. As illustrated in FIG. 5, when the magnitude $|\omega|$ of the rotation angle of the rotating body 20 exceeds the threshold 227, the rotation detection device 100 can detect that the rotating body 20 is in the opened state. Further, when the magnitude $|\omega|$ of the rotation angle of the rotating body 20 falls within the range of the threshold 228 or less, the rotation detection device 100 can detect that the rotating body 20 is in the closed state.

Figure 6A:
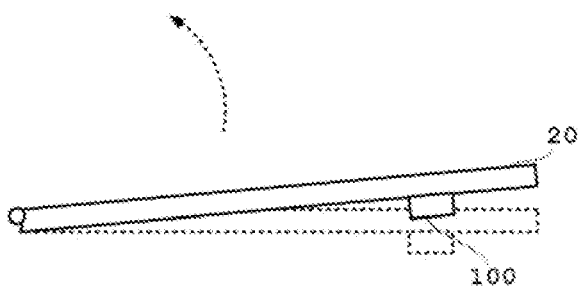
FIG. 6A is a first view illustrating a movement from when the rotating body 20 that was not in the normal position and in the closed state is rotated in accordance with the rotation operation to be in the opened state to when the rotating body is returned to the normal position to be in the closed state.
Figure 6A:
Figure 6B:
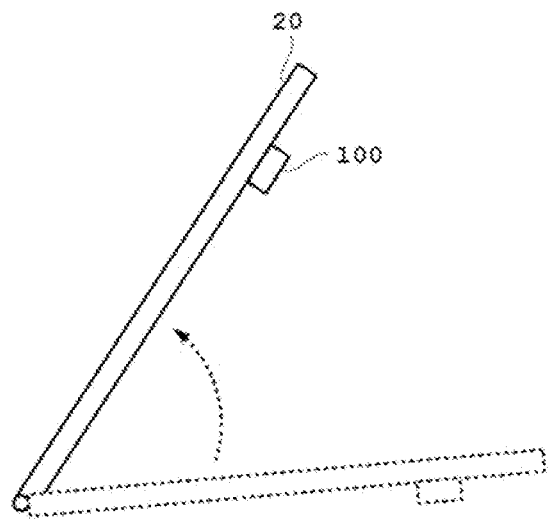
FIG. 6B is a second view illustrating a movement from when the rotating body 20 that was not in the normal position and in the closed state is rotated in accordance with the rotation operation to be in the opened state to when the rotating body is returned to the normal position to be in the closed state.
Figure 6B:
Figure 6C:
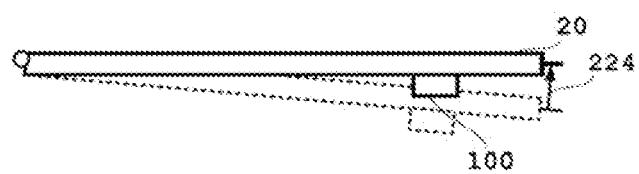
FIG. 6C is a third view illustrating a movement from when the rotating body 20 that was not in the normal position and in the closed state is rotated in accordance with the rotation operation to be in the opened state to when the rotating body is returned to the normal position to be in the closed state.
Figure 6C:
Figure 7:
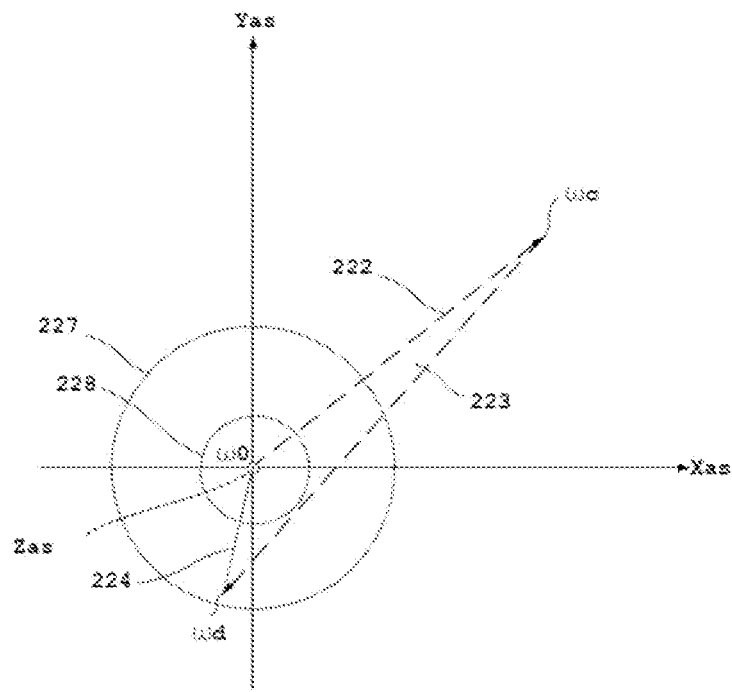
FIG. 7 is a diagram illustrating the rotation angle ω of the rotating body 20 detected by the rotation detection device 100 when the rotating body 20 moves as illustrated in FIGS. 6A to 6C.

FIGS. 6A to 6C are diagrams illustrating motions from when the rotating body 20 that is not in the normal position in the closed state rotates in response to the rotation operation to be in the opened state to when the rotating body is returned to the normal position to be in the closed state. FIG. 7 is a diagram illustrating the rotation angle $\omega$ of the rotating body 20 detected by the rotation detection device 100 when the rotating body 20 moves as illustrated in FIGS. 6A to 6C. As indicated by a solid line in FIG. 6A, the rotating body 20 may not be in the normal position as indicated by the dotted line in the closed state due to a reason that the user has not appropriately closed the rotating body 20. A case will be described, where the rotating body 20 is rotated from this position to a position indicated by the solid line in FIG. 6B to be in the opened state by the rotation operation, and then is returned to the normal position as indicated by the solid line in FIG. 6C by the rotation operation.

In this case, as illustrated in FIG. 7, the rotation angle $\omega$ of the rotating body 20 moves on a dotted line 222 from the origin $\omega_0$ (a first angle) of the rotation angle in the state illustrated by the solid line in FIG. 6A, and when the rotation angle exceeds the range of the threshold 227, it can be determined that the rotating body 20 is in the opened state. Further, the rotating body 20 reaches a rotation angle $\omega_c$ in a state where the rotating body 20 illustrated by the solid line in FIG. 6B is opened at the most. When the rotation operation is performed from the state shown by the solid line in FIG. 6B to close the rotating body 20 and return to the normal position shown by the solid line in FIG. 6C, the rotation angle $\omega$ of the rotating body 20 moves on the dotted line 223, does not pass through the range given by the threshold 228, and reaches a rotation angle $\omega_d$ outside the range given by the threshold 228 from the origin $\omega_o$, and an offset 224 may occur.

The reason why the offset 224 is generated is that although the rotating body 20 returns to the normal position as indicated by the solid line in FIG. 6C, the rotating body 20 is not in the normal position before receiving the rotation operation as indicated by the solid line in FIG. 6A. In such a case, as indicated by the dotted line in FIG. 6C, the rotation detection device 100 calculates the rotation angle ω of the rotating body 20 like the rotating body 20 has rotated beyond the normal position. Accordingly, when no measure is taken as it is, the rotation angle ω of the rotating body 20 does not fall within the range given by the threshold 228 even in a case where the rotating body 20 is actually at the normal position in the closed state. Therefore, in such a case, the rotation detection device 100 cannot detect that the rotating body 20 is in the closed state using only the threshold 228.

Figure 8:
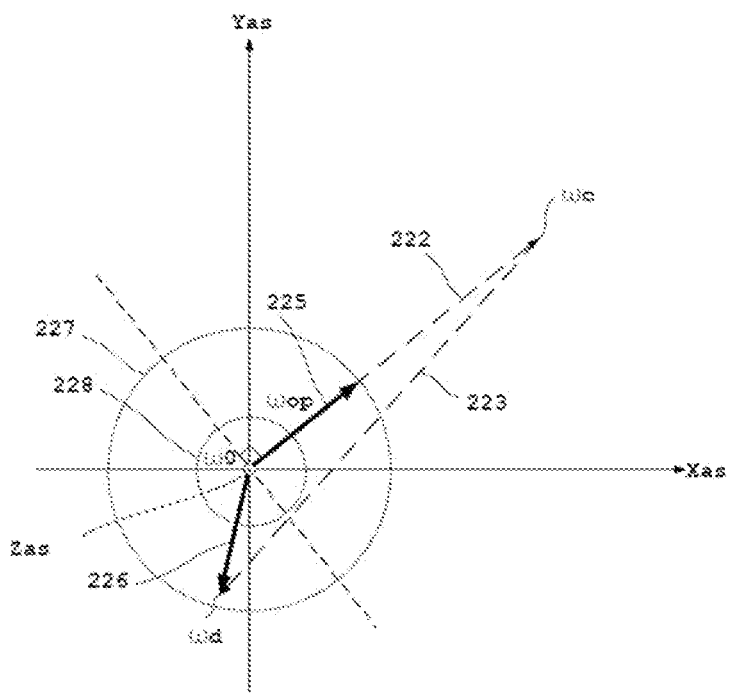
FIG. 8 is a diagram illustrating vectors 225 and 226 used for detection of the opened state and the closed state of the rotating body 20 by the rotation detection device 100 illustrated in FIG. 2A.

FIG. 8 is a diagram illustrating the vectors 225 and 226 used for detection of the opened state and the closed state of the rotating body 20 by the rotation detection device 100 illustrated in FIG. 2A. In order to solve such a problem, first, the rotation detection device 100 stores the vector 225 (=($\omega_{opX}$, $\omega_{opY}$, $\omega_{opZ}$); ($\omega_{op}$) of a rotation angle $\omega_{op}$ (a second angle) when the rotation angle ω of the rotating body 20 exceeds the threshold 227. Further, at a timing when it can be determined that the rotation of the rotating body 20 has ended, the rotation detection device 100 calculates the vector 226 (=($\omega_{dX}-\omega_{oX}$, $\omega_{kY}-\omega_{oY}$, $\omega_{dZ}-\omega_{oZ}$)) from the origin $\omega_o$ of the rotation of the rotating body 20 to the rotation angle $\omega_d$ (=($\omega_{dX}$, $\omega_{dY}$, $\omega_{dZ}$)).

Further, the rotation detection device 100 calculates an inner product (=($\omega_{opX}$ × ($\omega_{dX}-\omega_{oX}$), $\omega_{opY}$×($\omega_{dY}-\omega_{oY}$), $\omega_{opZ}$×($\omega_{dZ}-\omega_{oZ}$))) of the vector 225 and the vector 226. When an inner product is a negative value, that is, when a difference between the directions of vector 225 and vector 226 is within the range of 90° to 270°, the rotation detection device 100 also detects that the rotating body 20 is in the closed state. For example, when there is a possibility that the rotating body 20 rotates 90° or more like the door and the lid of the notebook PC, it is particularly effective to detect the closed state of the rotating body 20 in this manner. Further, in FIGS. 5, 7, and 8, the threshold 227 and the threshold 228 are different from each other, but these thresholds may be the same. In addition, the threshold 228 can be optimized within a range in which its magnitude does not exceed the threshold 227.

In this manner, the closed state of the rotating body 20 can be detected using the magnitude of the vector 226 and an inner product of the vector 225 and the vector 226 in combination. By using the inner product, even when the rotating body 20 is not opened or closed from the normal position, it is possible to reliably detect that the rotating body 20 has been turned from the opened state to the closed state. In addition, by using the inner product for detection of the closed state, the rotation detection device 100 can detect that the rotating body 20 is in the closed state without accurate information of the timing at which the rotating body 20 starts to rotate. Similarly, according to the rotation detection device 100, even when the rotation angles of the rotating body 20 in the opened state and the closed state are not known in advance, it is possible to detect whether the rotating body 20 is in the opened state or the closed state.

6. Processing of Rotation Detection Device 100

Figure 9:
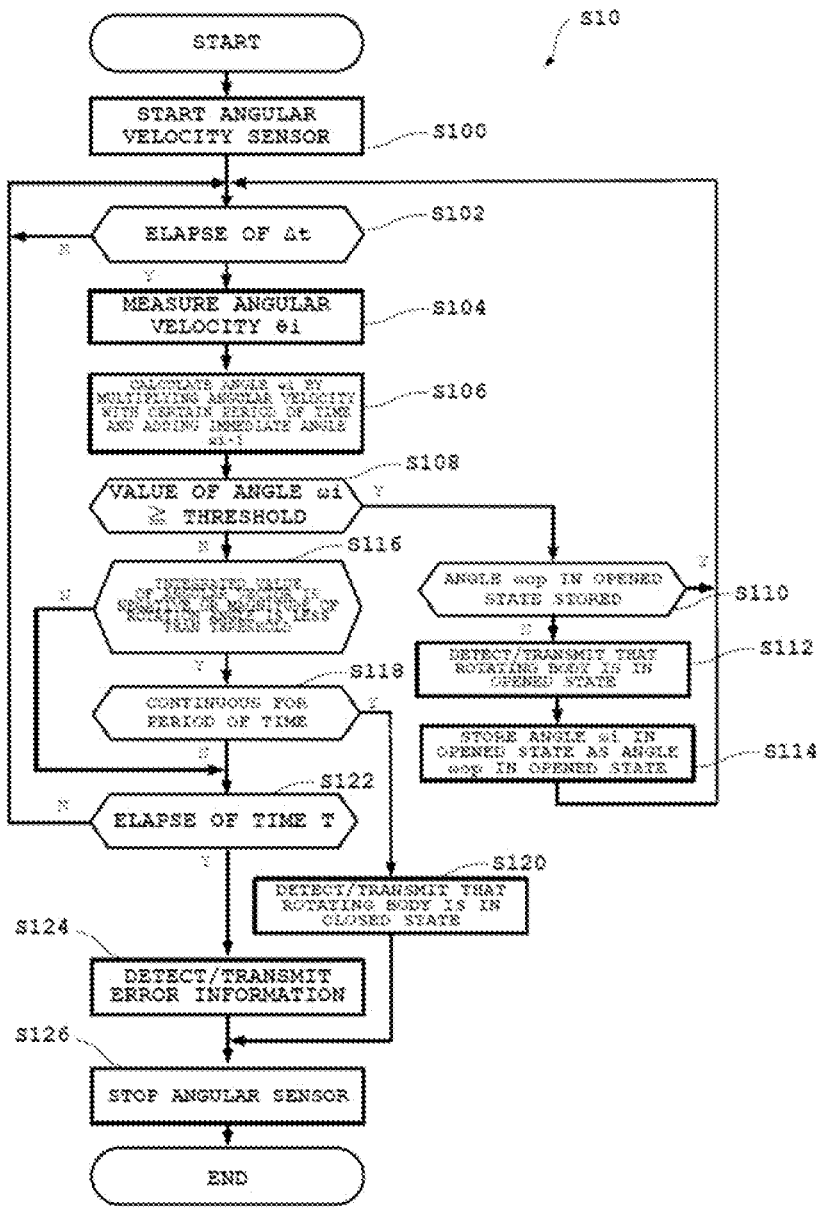
FIG. 9 is a diagram illustrating a processing flow of the rotation detection device 100 illustrated in FIG. 2A.

Hereinafter, processing S10 of the rotation detection device 100 will be described with reference to FIG. 9. FIG. 9 is a diagram illustrating the processing flow of the rotation detection device 100 illustrated in FIG. 2A. In step S100 illustrated in FIG. 9, the rotation detection device 100 starts processing of activating the angular velocity sensor 115 and detecting whether the rotating body 20 is in the opened state or the closed state.

In step S102, the rotation detection device 100 determines whether or not the predetermined time interval Δt (for example, 50 milliseconds) has elapsed since the last measurement of the rotation angular velocity $\theta_i$ of the rotating body 20. The rotation detection device 100 proceeds to processing of S104 when the time of Δt has elapsed, and remains in processing of S102 when the time of Δt has not elapsed.

In step S104, the rotation detection device 100 controls the angular velocity sensor 115 to measure the rotation angular velocity $\theta_i$ of the rotating body 20, and receives the measured rotation angular velocity $\theta_i$.

In step S106, the rotation detection device 100 adds the multiplication value of the time interval Δt and the rotation angular velocity $\theta_1$ to the origin $\omega_0$ when S106 is performed for the first time. When S106 is performed for the second and subsequent times, the multiplication value of the rotation angular velocity $\theta_i$ and the time interval Δt is added to the rotation angle $\omega_{i-1}$ of the rotating body 20 calculated so far, and the time integrated value between the times $t_0$ to $t_i$ of the rotation angular velocity θ is calculated as the rotation angle $\omega_i$.

In step S108, the rotation detection device 100 determines whether the magnitude |$\omega_i$| of the rotation angle $\omega_i$ is greater than or equal to the threshold 227 illustrated in FIGS. 5, 7, and 8. When |$\omega_i$| is greater than or equal to the threshold 227 (Y), the rotation detection device 100 proceeds to processing of S110, and when |$\omega_i$| is less than the threshold 227 (N), the rotation detection device 100 proceeds to processing of S116.

In step S110, the rotation detection device 100 determines whether or not the vector 225 ($\omega_{op}$) illustrated in FIG. 8 has already been stored. The rotation detection device 100 returns to processing of S102 when the rotation angle $\omega_{op}$ has already been stored (Y), and proceeds to processing of S112 when the rotation angle $\omega_{op}$ has not yet been stored (N).

In step S112, the rotation detection device 100 detects that the rotating body 20 is in the opened state, and transmits information indicating this to the external unit outside the rotation detection device 100 via the communication interface 114. The external unit of the rotation detection device 100 that has received this information performs processing such as notifying the administrator or the like of the rotating body 20 that the rotating body 20 is in the opened state.

In step S114, the rotation detection device 100 stores the rotation angle $\omega_i$ calculated in processing of S106 as the rotation angle $\omega_{op}$, and returns to processing of S102.

In step S116, the rotation detection device 100 calculates the inner product of the vector 225 and the vector 226 indicating the rotation angle $\omega_{op}$ illustrated in FIG. 8, and further calculates the magnitude of the vector 226 of the rotation angle $\omega_d$. The rotation detection device 100 proceeds to processing of S118 when the value of the calculated inner product is negative or when the vector 226 of the rotation angle $\omega_d$ is equal to or less than the threshold 228 (Y), and proceeds to processing of S122 when the value of the calculated inner product is not negative or when the vector 226 of the rotation angle cod is larger than the threshold 228 (N).

In step S118, the rotation detection device 100 determines whether or not a state in which the calculated value of the inner product is negative or the vector 226 of the rotation angle $\omega_d$ is equal to or less than the threshold 228 is continuous for a predetermined constant time, for example, 0.5 seconds (=Δt (50 milliseconds)×10) or more. When this state continues for a certain period of time or more (Y), the rotation detection device 100 determines that the rotation of the rotating body 20 is finished and a stable state is reached, and proceeds to processing of S120.

In step S120, the rotation detection device 100 detects that the rotating body 20 is in the closed state, and transmits information indicating this to the external unit via the communication interface 114. The external unit of the rotation detection device 100 that has received this information performs processing such as notifying the manager of the facility in which the rotating body 20 is disposed that the rotating body 20 is in the closed state.

In step S122, the rotation detection device 100 determines whether or not a predetermined time T, for example, 10 seconds (=Δt (50 milliseconds)×200) has elapsed as a sufficiently long time as an opening/closing time of the rotating body 20 after the processing of S100 is executed. The rotation detection device 100 proceeds to the processing of S124 when the time T has elapsed (Y), and returns to the processing of S102 when the time T has not elapsed (N).

In step S124, the rotation detection device 100 cannot detect whether the rotating body 20 is in the opened state or the closed state, and determines that a certain error has occurred. Further, the rotation detection device 100 transmits error information indicating the occurrence of error to the external unit 200 via the communication interface 114.

The external unit 200 may be the household electric appliance, for example, a refrigerator, and the rotating body 20 may be a door thereof. At this time, the refrigerator performs processing such as outputting a warning sound indicating that the door is left open when information indicating the opened state of the door is continuously sent from rotation detection device 100 for several minutes, for example.

Further, the external unit 200 may be the household electric appliance installed inside a building, for example, a lighting device, and the rotating body 20 may be the door of entrance of the building. When the information indicating that the door is in the opened state received from the rotation detection device 100 is received, the lighting device is turned on, and when the information indicating that the door is in the closed state is received, the lighting device is turned off.

Moreover, the external unit 200 may be a monitoring camera, and the rotating body 20 may be the door of entrance of a monitoring target. At this time, when the information indicating the opened state of the door received from the rotation detection device 100 changes to the information indicating the closed state and when a reverse change occurs, the monitoring camera captures the image of the entrance of the monitoring target, and captures and stores the image of the person who has opened and closed the door.

Further, the external unit 200 may be a combination of the administrator terminal unit and the monitoring camera, and the rotating body 20 may be the door of the building managed by the administrator. The administrator terminal unit outputs an alarm to the administrator when the information indicating the closed state of the door received from the rotation detection device 100 changes to the information indicating the opened state and when the reverse change thereto occurs. Further, when the information indicating the closed state of the door received from rotation detection device 100 changes to the information indicating the opened state, and when the reverse change occurs, the monitoring camera captures the image of the door of the building. Moreover, the administrator terminal unit displays the image near the door captured by the monitoring camera to the administrator.

Further, the external unit 200 may be the user terminal unit, and the rotating body 20 may be a door of a user's private car. The user terminal unit detects an abnormality when the information indicating that the rotating body 20 is in the closed state cannot be received from the rotation detection device 100 even though the user activates an engine of the private car or closes the door. Then, the alarm notifying the user that the door of the private car is in a so-called "half door" state is output.

Then, in the external unit 200, the external unit 200 may be the lock/unlock control unit, and the rotating body 20 may be the door of the house or the like. At this time, the lock/unlock control unit automatically controls and locks the door when the door is not locked even though the door is closed from the rotation detection device 100.

In step S126, the rotation detection device 100 stops the operation of the angular velocity sensor 115, and ends the process. In addition, although FIG. 9 illustrates a case where the closed state of the rotating body 20 is detected using both the threshold 228 and the inner product, the closed state of the rotating body 20 can also be detected using one of the threshold 228 and the inner product. Further, when the opened state and the closed state of the rotating body 20 are detected using the angular velocity sensor 115, the rotating body 20 is less susceptible to an influence of disturbance than a case where a magnet or the like is attached to the rotating body to detect these states. Moreover, it is not necessary to attach an accessory such as the magnet to the rotating body 20.

For example, in the technique disclosed in Patent Literature 1, a rotation speed of the rotating body is integrated and converted into the rotation speed, and the rotation speed is further integrated to obtain the rotation angle of the door. Accordingly, in such device, since an integration operation is repeated twice, the detected rotation angle of the rotating body is susceptible to an error or noise included in the output of the acceleration sensor. Further, such device cannot accurately detect whether the opening portions where the rotating body opens and closes are in the opened state or the closed state. However, according to the processing illustrated in FIG. 9, even in a case where the rotation angle of the rotating body 20 is not accurately known, the closed state and the opened state of the rotating body 20 can be accurately detected. Moreover, according to the processing illustrated in FIG. 9, it is possible to prevent an erroneous detection that the rotating body 20 is in the opened state although the rotating body 20 is actually in the closed state. In addition, according to the processing illustrated in FIG. 9, even when the errors due to disturbance such as noise, processing of obtaining the integrated value, and the like are accumulated, it is possible to accurately detect that the rotating body 20 is in the closed state. Also, according to the processing illustrated in FIG. 9, the opened state and the closed state of the rotating body 20 in which a steady state is not the closed state can be accurately detected.

Second Embodiment

Hereinafter, a second embodiment in which the rotation detection device 100 is applied to the door key attached to the entrance of the house or the like will be described. The automatic locking control unit 5 described as the second embodiment is an example of the external unit 200. When the automatic locking control unit 5 detects the closed state of the door key after a certain period of time has elapsed since the door was opened, the automatic locking control unit 5 automatically controls and locks the door key. In general, an automatic locking unit is used to enhance security by limiting a person who enters a room from outside the room.

Figure 10A:
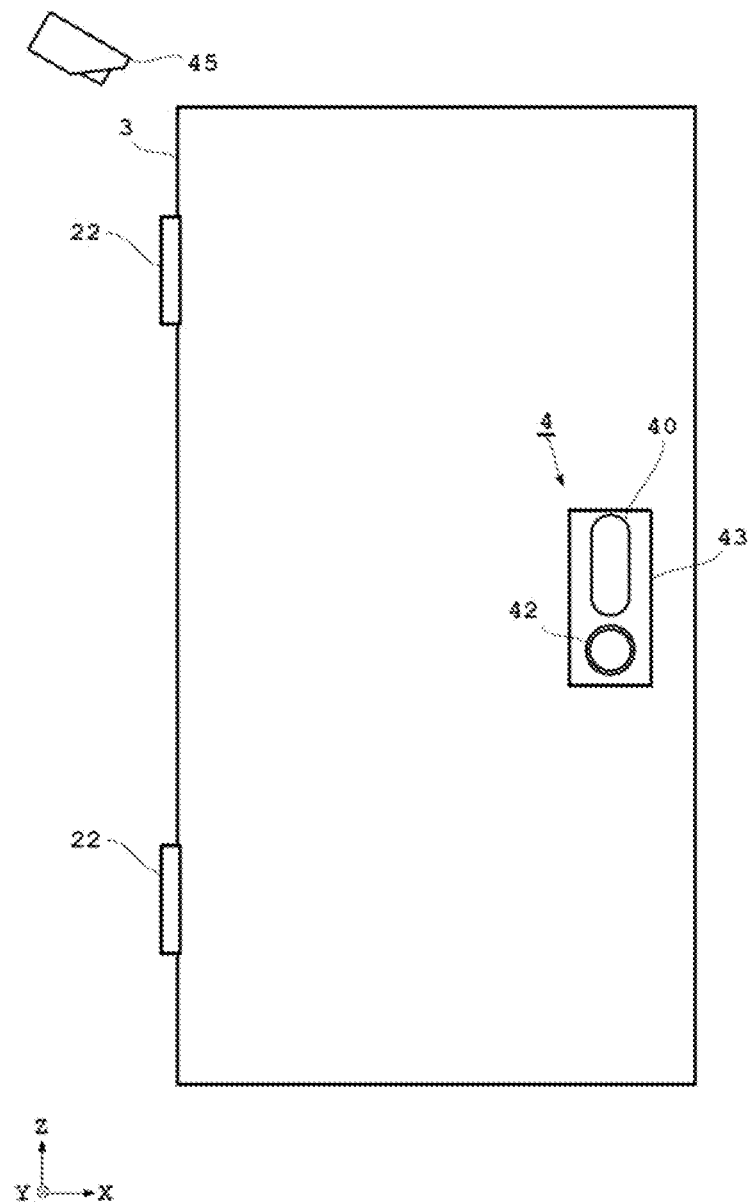
Figure 10B:
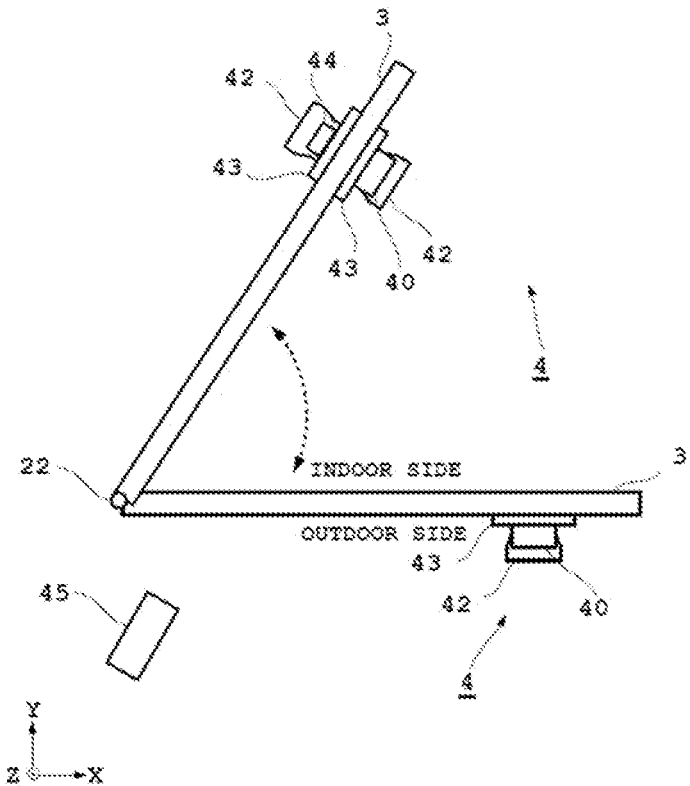

FIGS. 10A and 10B are first and second views illustrating the automatic locking unit 4 attached to the key of a door 3 of the entrance of the house or the like. As shown in FIGS. 10A and 10B, similarly to the rotating body 20 shown in FIGS. 3A and 3B, the door 3 is pushed by a manual work of the user and rotates around the axis of the hinge 22.

The automatic locking unit 4 is mounted on a support body 43 of the key (not illustrated) originally mounted on the outdoor side of the door 3 so as to be engaged with a thumb turn (not illustrated) of the key and at a position not interfering with a door knob 42. The automatic locking unit 4 includes the main body case 40. Further, the rotation detection device 100 and the automatic locking control unit 5 illustrated in FIG. 11 are housed in the main body case 40.

Figure 11:
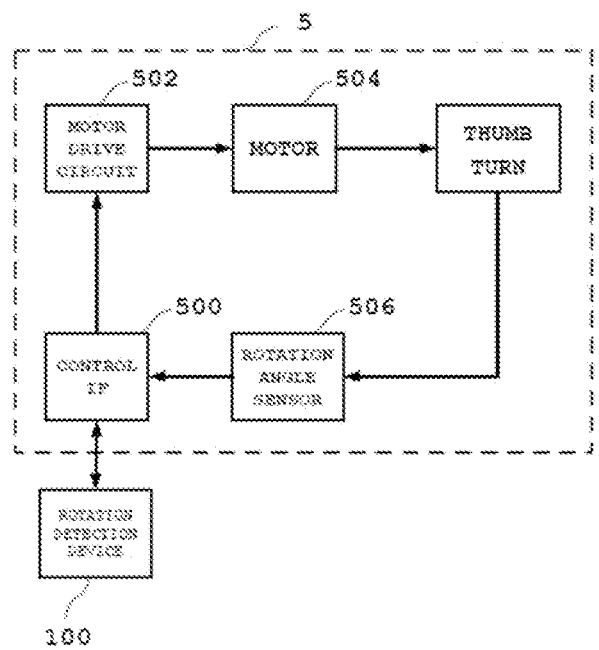
FIG. 11 is a block diagram showing an example of a configuration of an automatic locking control unit 5 accommodated in a main body case 40 of the automatic locking unit 4 illustrated in FIGS. 10A and 10B.

FIG. 11 is a block diagram illustrating one example of a configuration of the automatic locking control unit 5 that is housed in the main body case 40 of the automatic locking unit 4 illustrated in FIGS. 10A and 10B and locks and unlocks (locks/unlocks) the door 3 by controlling the key of the door 3. As illustrated in FIG. 11, the automatic locking control unit 5 includes a control interface (control IF) 500, a motor 504, a motor drive circuit 502, and a rotation angle sensor 506.

The control interface 500 is electrically connected to each component of the rotation detection device 100 via the control line and the data line. The control interface 500 receives information indicating that the door 3 is in the opened state or the closed state from the rotation detection device 100, and outputs the control signal to the motor drive circuit 502. Further, the control interface 500 receives the rotation angle of the thumb turn of the key detected by the rotation angle sensor 506 and transmits the rotation angle to the rotation detection device 100. The automatic locking control unit 5 functions as the lock/unlock control unit that controls the locking and unlocking of the door 3 by these components. In other words, the automatic locking control unit 5 functions as the external unit 200 that performs locking and unlocking in response to the communication of detection result of the opened state or the closed state from the rotation detection device 100.

The motor drive circuit 502 drives and rotates the motor 504 in accordance with the control signal input from the control interface 500. The motor 504 is connected to the thumb turn via a member such that the thumb turn of the key can be rotated. When driven by the motor drive circuit 502, the motor 504 rotates the thumb turn of the key to bring the key into an unlocked state or a locked state. The rotation angle sensor 506 detects the rotation angle of the thumb turn of the key and outputs the rotation angle to the rotation detection device 100 via the control interface 500.

Figure 12:
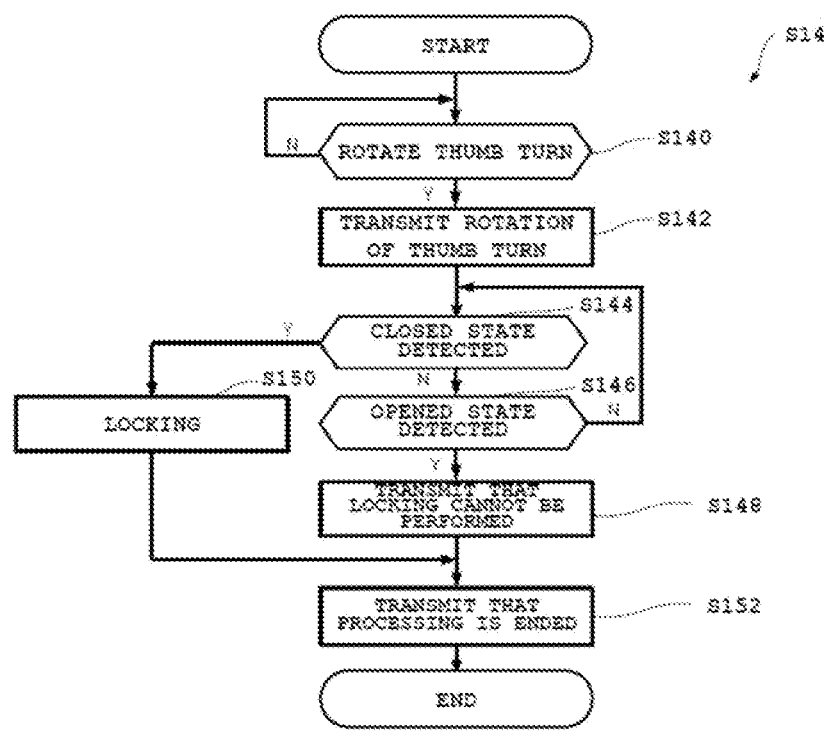
FIG. 12 is a view illustrating a processing flow of the automatic locking control unit 5 illustrated in FIGS. 10A, 10B, and 11.

Hereinafter, the processing S14 of the automatic locking control unit 5 will be described. FIG. 12 is a diagram illustrating the processing flow of the automatic locking control unit 5 illustrated in FIG. 11. In step 140 illustrated in FIG. 12, the control interface 500 of the automatic locking control unit 5 receives the output signal of the rotation angle sensor 506. The automatic locking control unit 5 proceeds to processing of S142 when the output signal of the rotation angle sensor 506 indicates the rotation of the thumb turn (Y), and remains in the processing of S140 when the output signal does not indicate the rotation (N).

In step S142, the control interface 500 of the automatic locking control unit 5 transmits information indicating that the thumb turn has been rotated to the rotation detection device 100. Upon receiving this information, the rotation detection device 100 activates the angular velocity sensor 115. The control interface 500 causes the rotation detection device 100 to detect whether the door 3 is opened or closed. When the automatic locking control unit 5 receives information indicating that the door 3 has been opened or closed from the rotation detection device 100, the processing proceeds to S144.

In step S144, the control interface 500 determines whether the closed state of the door 3 is detected. The automatic locking control unit 5 proceeds to processing of S150 when the closed state of the door 3 is detected (Y), and proceeds to the processing of S146 when the closed state of the door 3 is not detected (N). Specifically, in S120 of FIG. 9, the information indicating that the rotating body is in the closed state is transmitted from the rotation detection device 100 to the automatic locking control unit 5, and the automatic locking control unit 5 determines whether or not the information has been received.

In step S146, the control interface 500 determines whether the opened state of the door 3 is detected. Specifically, in S112 of FIG. 9, the information indicating that the rotating body is in the opened state is transmitted from the rotation detection device 100 to the automatic locking control unit 5, and the automatic locking control unit 5 determines whether or not the information has been received. The automatic locking control unit 5 proceeds to processing of S148 when the opened state of the door 3 is detected (Y), and returns to processing of S144 when the opened state of the door 3 is not detected (N).

In step S148, the control interface 500 transmits, to the rotation detection device 100, the information indicating that the door 3 cannot be locked because the door 3 is in the opened state.

In step S150, the control interface 500 outputs the control signal to the motor drive circuit 502 to drive the motor 504. The motor 504 driven by the motor drive circuit 502 rotates, and causes the thumb turn of the key of the door 3 to rotate in a locking direction to lock the door 3.

In step S152, the control interface 500 transmits the information indicating that the processing has ended to the rotation detection device 100. When this information is received, the rotation detection device 100 causes the angular velocity sensor 115 to stop.

The processing of the automatic locking control unit 5 illustrated in FIG. 12 ensures the locking of the door 3 by the automatic locking unit 4, and improves the security of the house or the like provided with the automatic locking unit 4. Further, according to the processing illustrated in FIG. 12, since a start of rotation of the door 3 can be detected by the rotation of the thumb turn, the start and stop of the angular velocity sensor 115 can be controlled more easily in a timely manner than the processing illustrated in FIG. 9. In addition, although FIG. 12 illustrates a case where the automatic locking control unit 5 locks the key, the automatic locking control unit 5 can also unlock the key by appropriately changing the process.

Third Embodiment

Hereinafter, a third embodiment will be described. The external unit 200 may be a monitoring camera 45 shown in FIGS. 10A and 10B. The monitoring camera 45 captures and monitors an image of the door 3. For example, in S112 and S120 in FIG. 9, the rotation detection device 100 transmits the information indicating that the rotating body is in the opened state or the information indicating that the rotating body is in the closed state to the monitoring camera 45. The monitoring camera 45 receives the information, and starts imaging at the timing of receiving the information indicating that the door 3 is closed. The monitoring camera 45 starts the imaging at the timing of receiving the information indicating that the door 3 is opened. In this way, by controlling the monitoring camera 45 by the rotation detection device 100, a person who opens and closes the door 3 can be specified, and the security of the facility to be monitored or the like can be further improved.

Fourth Embodiment

Hereinafter, a fourth embodiment will be described. In the first to third embodiments, a case where the rotation detection device 100 is used for detecting whether the rotating body 20 is in the opened state or the closed state, the locking and unlocking by the automatic locking control unit 5 using the rotation detection device 100, and the like has been exemplified, but the rotation detection device 100 has a wider application. For example, when the rotation detection device 100 detects the opened state of the rotating body 20 such as the door of the house (S112 in FIG. 9), the information indicating that the rotating body 20 is in the opened state is transmitted to the lighting device or an air conditioner that is one of the external units 200. The lighting device or the air conditioner that has received the information performs the control to turn on lighting or air conditioning. On the other hand, when the rotation detection device 100 detects the closed state of the rotating body 20 such as the door of the house (S120 in FIG. 9), the information indicating that the rotating body 20 is in the closed state is transmitted to the lighting device or the air conditioner. The lighting device or the air conditioner that has received the information performs the control to turn off the lighting or the air conditioning. As described above, by using the detection result of the rotation detection device 100 for the household electric appliance, it is possible to prevent the household electric appliance from being left unturned off or to make indoor environment appropriate.

Further, when the rotation detection device 100 detects the opened state of the rotating body 20 such as the door of a delivery box (S112 in FIG. 9), the information indicating that the rotating body 20 is in the opened state is transmitted to the administrator terminal unit of the delivery box that is one of the external units 200. The administrator terminal unit that has received the information notifies the administrator that the delivery box has been used. In this manner, by using the detection result of the rotation detection device 100 for the delivery box, it is possible to smoothly manage the delivery box.

Fifth Embodiment

Hereinafter, a fifth embodiment will be described. For example, when a resident of the house is absent, a person other than the resident, such as a housekeeping agent, a home delivery agent, or a cleaning agent, can be invited into the house. In such a case, by using the rotation detection device 100 for the door at the entrance of the house, it is possible to accurately notify the resident of the house of the situation in which the door has been opened and closed. Specifically, the rotation detection device 100 transmits the information indicating that the door, which is the rotating body 20, is in the opened state or the closed state (S112 or S120 in FIG. 9) to the terminal unit of the resident. Further, similarly to the third embodiment, transmission is performed to the monitoring camera installed on the door. Accordingly, it is possible to quickly grasp that the person other than the resident has opened and closed the door, and it is also possible to grasp behavior of the person other than the resident. In addition, in a field called an intelligent house and a smart home, it is possible to transmit, to the terminal unit of the resident, that the door has been locked or unlocked by the person other than the resident who has been authenticated in advance. Accordingly, the resident can know that the door has been locked or unlocked, but higher security can be realized by further receiving the information from the rotation detection device 100.

Sixth Embodiment

Hereinafter, a sixth embodiment will be described. The external unit 200 may be the terminal unit of a management department of a company. When the external unit 200 is the terminal unit of the management department of the company, the door installed at the entrance of an office building or a space of the company or the like, the terminal unit, and an IC card system capable of uniquely identifying each employee of the company are combined. At this time, by receiving the information indicating that the door as the rotating body 20 is in the opened state or the closed state (S112 or S120 in FIG. 9) from the rotation detection device 100 disposed on the door, it is possible to accurately detect and store the time when each employee opens and closes the door of the office or the like. Therefore, by combining and cooperating the automatic locking control unit 5 and the IC card system, it is possible to realize an entrance/exit management system capable of accurately managing entrance time and exit time of the employee of the company.

Modifications

As described above, the rotation detection device 100 and an application device thereof can be used in various applications other than the applications described above. For example, the rotation detection device 100 detects the opening and closing of the door of the device mounted on an aircraft or the like, and notifies an occupant, a maintenance person, and the like of the opening and closing, whereby safety of transportation equipment such as an aircraft can be improved. Alternatively, the rotation detection device 100 and an application device thereof are applied to the lid of the housing container as the rotating body, and can notify surrounding workers or the like that the lid of the housing container is in the opened state. By configuring the rotation detection device 100 and the application device thereof in this manner, it is possible to prevent leakage of medicine in the housing container, and the like.

The processing and procedures according to the present disclosure can be realized not only by the devices explicitly described in the embodiments but also by software, hardware, or a combination thereof. Specifically, the processing and procedures described in this description can be implemented by implementing logic corresponding to the processing in a medium such as an integrated circuit, a volatile memory, a nonvolatile memory, a magnetic disk, or an optical storage. Further, the processing and procedures described in the present description can be implemented as a computer program, and can be executed by various computers including the terminal unit and the server device.

The processing and procedures described herein as being performed by a single device, software, component, and/or module may be performed by a plurality of devices, a plurality of software, a plurality of components, and/or a plurality of modules. Further, in the present description, various types of information described to be stored in a single memory and storage device can be stored in a distributed manner in a plurality of memories included in a single device or a plurality of memories arranged in a distributed manner in a plurality of devices. Moreover, a plurality of pieces of software and hardware described in this description can be implemented by integrating the plurality of pieces of software and hardware into fewer components or by decomposing the plurality of pieces of software and hardware into more components.

Although embodiments of the present invention have been described, the embodiments have been presented as examples, and are not intended to limit the scope of the invention. These novel embodiments can be implemented in other various forms, and various omissions, substitutions, and changes can be made without departing from the gist of the invention. These embodiments and modifications thereof are included in the scope and the gist of the present invention, and are included in the invention described in the claims and an equivalent scope thereof.

INCORPORATION BY REFERENCE

This application claims priority to Japanese Patent Application No. 2021-176911 filed Oct. 28, 2021, which is expressly incorporated by reference herein in its entirety.

What is claimed is:

1. A rotation detection device, comprising
an angular velocity sensor attached to a rotating body that rotates and configured to detect an angular velocity of the rotating body;
a memory configured to store a program; and
at least one processor configured to execute the program so as to:
obtain a first angle of the rotating body during an opening period in a rotation operation on the rotating body based on the angular velocity;
obtain a second angle of the rotating body during the entire period of the rotation operation on the rotating body based on the angular velocity;
obtain a first vector from a rotation origin to the first angle;
obtain a second vector from the rotation origin to the second angle; and
determine that the rotating body is in a closed state when an inner product of the first and second vectors is negative.

2. A rotation detection device according to claim 1, wherein the at least one processor is further configured to:
determine that the rotating body is in an opened state when:
an inner product of the first and second vectors is positive.

3. The rotation detection device according to claim 1, wherein the at least one processor is further configured to detect that the rotating body is in an opened state when a difference between the second angle and the first angle is larger than a predetermined threshold.

4. The rotation detection device according to claim 1, wherein the at least one processor is further configured to detect that the rotating body is in the closed state in a case where a difference between the second angle and the first angle is equal to or less than a predetermined threshold.

5. The rotation detection device according to claim 3, wherein
the predetermined threshold includes a first threshold and a second threshold smaller than the first threshold,
when a difference between the second angle and the first angle is larger than the first threshold, the at least one processor is further configured to detect that the rotating body is in an opened state, and
in a case where a difference between the second angle and the first angle is equal to or less than the second threshold, the at least one processor is further configured to detect that the rotating body is in the closed state.

6. The rotation detection device according to claim 1, further comprising:
a communication interface for communicating with an external unit connected in a wired manner or a wireless manner, wherein
the at least one processor is further configured to transmit, to the external unit via the communication interface, a detection result that the rotating body is in at least one of the opened state and the closed state.

7. The rotation detection device according to claim 6, wherein
the rotating body is a door, and
the external unit is at least one of:
a user terminal possessed by a user who performs the rotation operation of the door;
an administrator terminal possessed by an administrator who manages a facility in which the door is installed; and
a household electric appliance disposed in the facility.

8. The rotation detection device according to claim 6, wherein
the rotating body is a door,
the external unit is a lock/unlock control unit configured to control locking/unlocking of the door, and
the at least one processor is further configured to transmit, to the lock/unlock control unit via the communication interface, a detection result that the door is in the closed state in order to control the locking of the door by the lock/unlock control unit.

9. A rotation detection method for causing at least one processor to execute a process, the rotation detection method comprising executing on the at least one processor the steps of:
obtaining a first angle of a rotating body during an opening period in a rotation operation on the rotating body based on an angular velocity of the rotating body, the angular velocity being obtained by an angular velocity sensor attached to the rotating body;
obtaining a second angle of the rotating body during an entire period of the rotation operation on the rotating body based on the angular velocity;
obtaining a first vector from a rotation origin to the first angle;
obtaining a second vector from the rotation origin to the second angle; and
determining that the rotating body is in a closed state when an inner product of the first and second vectors is negative.

10. A computer program product embodying computer readable instructions stored on a non-transitory computer-readable medium for causing a computer to execute a process by a processor so as to perform the steps of:
obtaining a first angle of a rotating body during an opening period in a rotation operation on the rotating body based on an angular velocity of the rotating body, the angular velocity being obtained by an angular velocity sensor attached to the rotating body;
obtaining a second angle of the rotating body during an entire period in the rotation operation on the rotating body based on the angular velocity;
obtaining a first vector from a rotation origin to the first angle;
obtaining a second vector from the rotation origin to the second angle; and determining that the rotating body is in a closed state when an inner product of the first and second vectors is negative.

\* \* \* \* \*